United States Patent
Hakeem

(10) Patent No.: US 9,836,705 B2
(45) Date of Patent: Dec. 5, 2017

(54) VEHICLE GENERATED SOCIAL NETWORK UPDATES

(71) Applicant: Ford Global Technologies, LLC, Dearborn, MI (US)

(72) Inventor: Mohannad Hakeem, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 23 days.

(21) Appl. No.: 14/285,939

(22) Filed: May 23, 2014

(65) Prior Publication Data

US 2015/0339593 A1    Nov. 26, 2015

(51) Int. Cl.

| | |
|---|---|
| *G06Q 10/00* | (2012.01) |
| *G06Q 50/00* | (2012.01) |
| *H04W 4/02* | (2009.01) |
| *G06Q 10/10* | (2012.01) |
| *H04L 12/58* | (2006.01) |
| *H04W 4/20* | (2009.01) |

(52) U.S. Cl.
CPC .......... *G06Q 10/00* (2013.01); *G06Q 10/107* (2013.01); *G06Q 50/01* (2013.01); *H04L 51/32* (2013.01); *H04W 4/023* (2013.01); *G06F 2221/2101* (2013.01); *G06F 2221/2111* (2013.01); *G06F 2221/2115* (2013.01); *H04W 4/206* (2013.01)

(58) Field of Classification Search
CPC ....... G08G 1/0104; G06F 17/00; G06F 15/16; G06F 2221/2101; G06F 2221/2115; G06F 2221/2111; G08B 1/08; H04W 4/00; H04W 4/206; H04W 4/046; H04W 4/023; G06Q 50/01; G06Q 10/00; G06Q 10/107; H04L 67/02; H04L 67/12; H04L 51/32; G06C 50/01

USPC .................. 701/117, 300; 705/319; 455/416
See application file for complete search history.

(56) References Cited

U.S. PATENT DOCUMENTS

| | | | |
|---|---|---|---|
| 8,560,013 B2 | 10/2013 | Jotanovic | |
| 2007/0203618 A1* | 8/2007 | McBride et al. | ................. 701/2 |
| 2011/0045842 A1 | 2/2011 | Rork et al. | |
| 2011/0238752 A1 | 9/2011 | Weiss et al. | |
| 2012/0066301 A1* | 3/2012 | Holland | ........................ 709/204 |
| 2012/0149345 A1* | 6/2012 | Jotanovic | .................. 455/414.1 |
| 2012/0197463 A1 | 8/2012 | Brennan et al. | |
| 2012/0299713 A1* | 11/2012 | Elia et al. | ..................... 340/435 |

(Continued)

FOREIGN PATENT DOCUMENTS

| | | |
|---|---|---|
| KR | 20130036126 | 11/2013 |
| WO | 2013101182 A | 7/2013 |

OTHER PUBLICATIONS

GB Search Report for Application No. GB1508750.5 dated Nov. 9, 2015.

*Primary Examiner* — Nga X Nguyen
(74) *Attorney, Agent, or Firm* — Frank A. MacKenzie; Bejin Bieneman PLC

(57) ABSTRACT

A vehicle system includes a navigation system, a communication interface, and a processing device. The navigation system determines a first vehicle location. The communication interface receives social network information over a communication network. The social network information includes a second vehicle location. A processing device determines the proximity of the first vehicle location to the second vehicle location and generates a message based on the proximity.

15 Claims, 2 Drawing Sheets

(56) References Cited

U.S. PATENT DOCUMENTS

| | | | |
|---|---|---|---|
| 2013/0080345 A1* | 3/2013 | Rassi | G06Q 50/01 705/319 |
| 2014/0214933 A1* | 7/2014 | Liu | H04L 67/02 709/204 |
| 2015/0160019 A1* | 6/2015 | Biswal | G01C 21/26 701/1 |

* cited by examiner

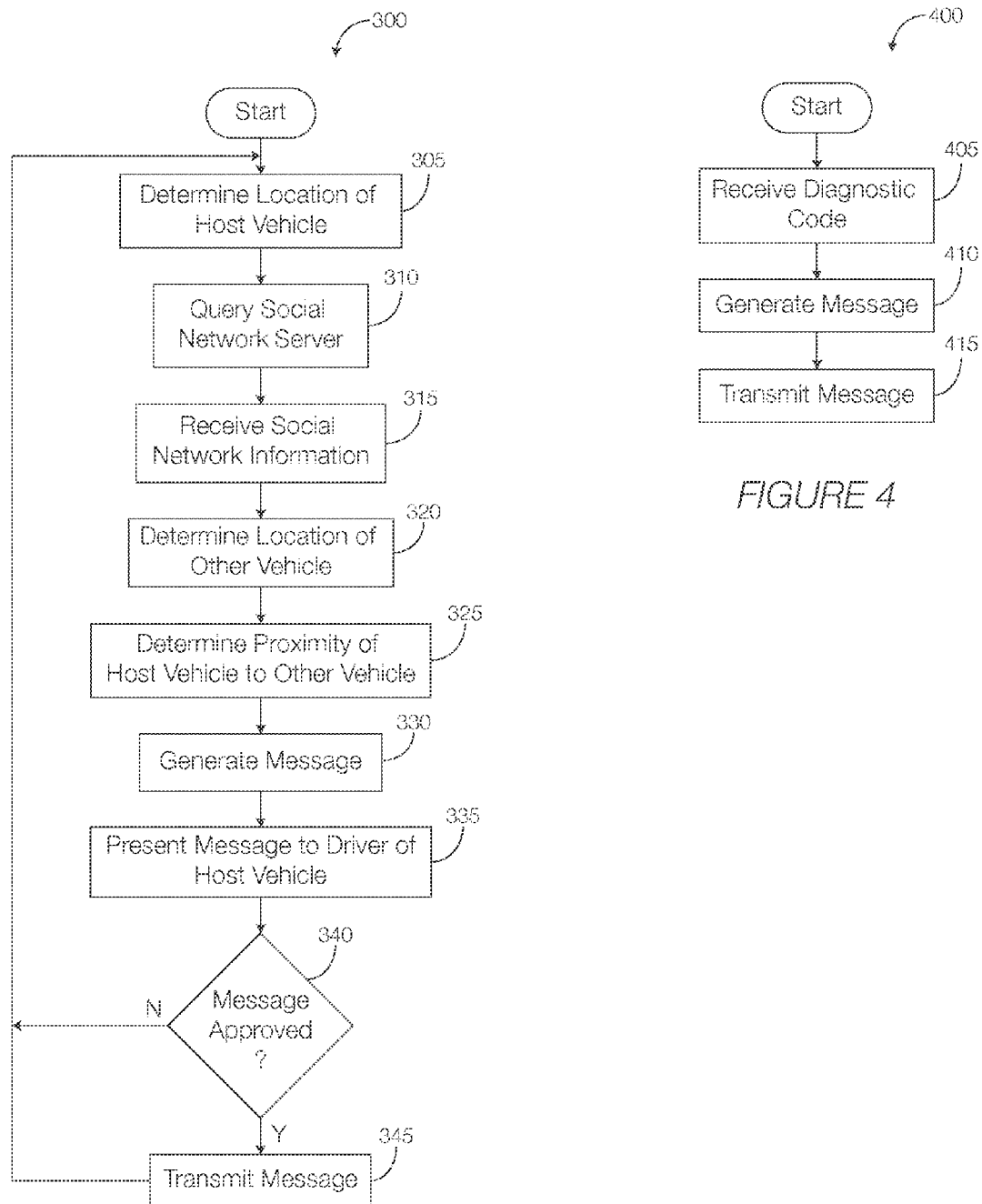

VEHICLE GENERATED SOCIAL NETWORK UPDATES

BACKGROUND

Social networking websites allow users to share information with others. In general, social networking websites allow users to share status updates, pictures, videos, and links to other websites. Some social networking websites provide a platform for games. Users that have a social networking relationship are sometimes referred to as "friends," "connections," and "followers" among others. Social networking websites are commonly accessed through a computer, such as a desktop, laptop, or tablet, or through a smartphone.

BRIEF DESCRIPTION OF THE DRAWINGS

FIG. 3 is a flowchart of an example process that may be executed by the vehicle system of FIG. 2.

FIG. 4 is a flowchart of another example process that may be executed by the vehicle system of FIG. 2.

DETAILED DESCRIPTION

An example vehicle system includes a navigation system, a communication interface, and a processing device. The navigation system determines a first vehicle location. The communication interface receives social network information over a communication network. The social network information includes a second vehicle location. A processing device determines the proximity of the first vehicle location to the second vehicle location and generates a message based on the proximity. Accordingly, the vehicle system can determine when the vehicles of two or more users with a social network relationship are near one another. The vehicle system can automatically generate and post a status update indicating the proximity of the users. The status update may further present a common experience by the users. Examples of common experiences may include when two or more users are sitting in the same traffic jam, listening to the same radio station or songs, passing a particular landmark at or around the same time, or the like. In addition, the status update may include various vehicle metrics during a trip. The metrics may include highest or average speed, fuel economy, driving time, driving distance, diagnostic codes, etc. The system shown may take many different forms and include multiple and/or alternate components and facilities. The exemplary components illustrated are not intended to be limiting. Indeed, additional or alternative components and/or implementations may be used.

Figure 1:
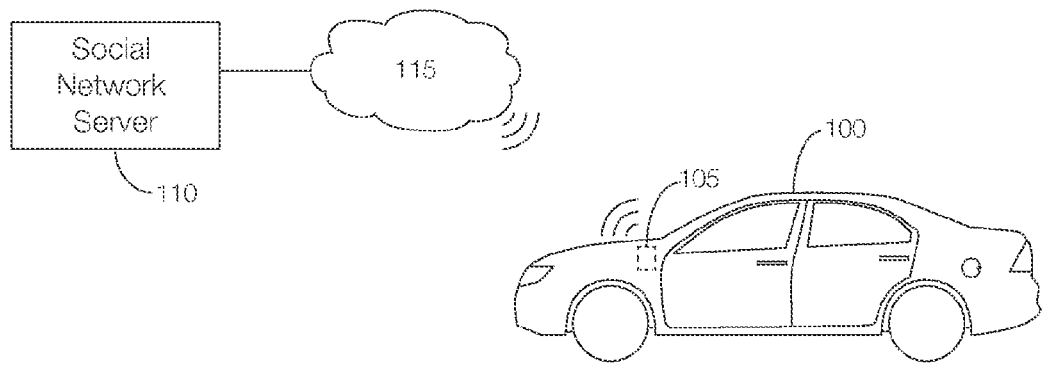
FIG. 1 illustrates an example vehicle for generating social network updates.

As illustrated in FIG. 1, the vehicle, referred to as the host vehicle 100, may include an incorporated system 105 configured to determine the proximity of the host vehicle 100 to another vehicle. The system 105 may be further configured to generate and transmit messages to a social network server 110 over, e.g., a communication network 115. The messages indicate that two or more users with a social network relationship have similar driving experiences. Examples of similar driving experiences may include when two or more users are sitting in the same traffic jam, listening to the same radio station or songs, passing a particular landmark at or around the same time, or the like. In addition, the status update may include various vehicle metrics during a trip. The metrics may include highest or average speed, fuel economy, driving time, driving distance, diagnostic codes, etc. Although illustrated as a sedan, the vehicle may include any passenger or commercial vehicle such as a car, a truck, a sport utility vehicle, a taxi, a bus, etc. In some possible approaches, as discussed below, the vehicle is an autonomous vehicle configured to operate in an autonomous (e.g., driverless) mode, a partially autonomous mode, and/or a non-autonomous mode.

Figure 2:
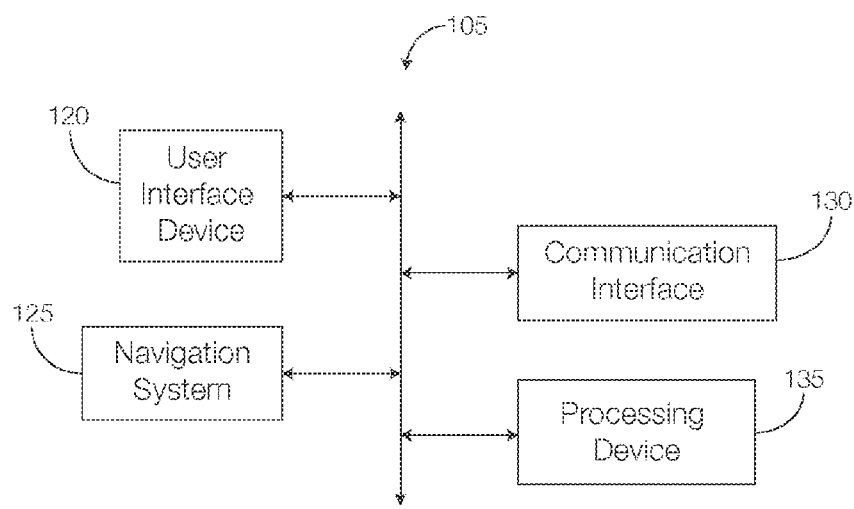
FIG. 2 illustrates an example vehicle system that may be incorporated into the vehicle of FIG. 1.

FIG. 2 is a block diagram showing example components of the system 105. As shown, the system 105 includes a user interface device 120, a navigation system 125, a communication interface 130, and a processing device 135.

The user interface device 120 may be configured to present information to a user, such as a driver, during operation of the host vehicle 100. Moreover, the user interface device 120 may be configured to receive user inputs. Thus, the user interface device 120 may be located in the passenger compartment of the host vehicle 100. In some possible approaches, the user interface device 120 may include a touch-sensitive display screen. In one possible approach, status update messages automatically generated by the system 105 may be presented to the user via the user interface device 120. Moreover, the message may not be transmitted to the social network server 110 until the message has been approved by the user. One way to approve the message may be via a user input provided to the user input device.

The navigation system 125 may be configured to determine a position of the host vehicle 100, such as a current location of the host vehicle 100. The navigation system 125 may include a Global Positioning System (GPS) receiver configured to triangulate the position of the host vehicle 100 relative to satellites or terrestrial based transmitter towers. The navigation system 125, therefore, may be configured for wireless communication. The navigation system 125 may be further configured to develop routes from the current location to a selected destination, as well as display a map and present driving directions to the selected destination via, e.g., the user interface device 120. In some instances, the navigation system 125 may develop the route according to a user preference. Examples of user preferences may include maximizing fuel efficiency, reducing travel time, travelling the shortest distance, or the like. In some instances, the location of the host vehicle 100 may be transmitted to the social network server 110 via, e.g., the communication interface 130 so that the location of the host vehicle 100 can be shared with and used by systems incorporated into other vehicles, such as the vehicles of friends of the driver of the host vehicle 100.

The communication interface 130 may be configured to facilitate wired and/or wireless communication between the components of the vehicle and other devices, such as the social network server 110 or even another vehicle when using, e.g., a vehicle-to-vehicle communication protocol. The communication interface 130 may be configured to receive messages from, and transmit messages to, a cellular provider's tower and the Telematics Service Delivery Network (SDN) associated with the vehicle that, in turn, may establish communication with a user's mobile device such as a cell phone, a tablet computer, a laptop computer, a fob, or any other electronic device configured for wireless communication via a secondary or the same cellular provider. Cellular communication to the telematics transceiver through the SDN may also be initiated from an internet connected device such as a PC, Laptop, Notebook, or WiFi connected phone. The communication interface 130 may also be configured to pair and communicate directly with the user's remote device or any other device using any number of communication protocols such as Bluetooth®, Bluetooth® Low Energy, or WiFi.

Accordingly, the communication interface 130 may be configured to receive messages from and/or transmit messages to a remote server, such as the social network server 110, either directly or through the paired mobile device. The communication interface 130 may be configured to receive social network information from the social network server 110. Social network information may identify "friends" (e.g., those with a social network relationship with the user of the host vehicle 100), the location of one or more friends' vehicles, or the like. The location may include a ZIP code, city, county, latitude and longitude coordinates, nearest intersection, or the like.

The processing device 135 may be configured to compare the location of the host vehicle 100 to the location of other vehicles operated by friends of the driver of the host vehicle 100. The processing device 135 may determine the locations of other vehicles from the social network information received from the social network server 110. The processing device 135 may determine the proximity of the host vehicle 100 to the other vehicles and compare the proximity to a predetermined threshold. The threshold may be based on a distance between the locations. Alternatively, the threshold may consider whether the locations are in the same ZIP code, city, county, etc.

If the processing device 135 determines that the host vehicle 100 and the other vehicle are within the predetermined distance threshold, which may include both vehicles being in, e.g., the same ZIP code, city, or county, the processing device 135 may generate a message describing a common driving experience relative to the driver of the host vehicle 100 and the driver of the other vehicle. As discussed above, the common driving experience may indicate that both vehicles have been stuck in the same traffic jam, both drivers are listening to the same radio station, both drivers are near or recently passed a particular landmark, etc. Alternatively or in addition, the processing device 135 may generate the message to include metrics, as discussed above. The processing device 135 may be configured to identify the driver of the other vehicle from the social network information. Therefore, in some possible approaches, the processing device 135 may be configured to generate the message to identify the driver of the other vehicle.

The processing device 135 may transmit the message to the social network server 110 via, e.g., the communication interface 130. Prior to transmitting the message, the processing device 135 may prompt the driver of the host vehicle 100 to accept or confirm the message. The prompt may be presented via the user interface device 120. The processing device 135 may also receive the driver's acceptance of the message through a user input provided to the user interface device 120.

In some implementations, the processing device 135 may be configured to query the social network server 110 for the social network information. The queries may be transmitted periodically or upon occurrence of a predetermined event. Examples of predetermined events may include, e.g., when the host vehicle 100 is stopped in traffic, when the host vehicle 100 is near a particular landmark, when a radio of the host vehicle 100 is tuned to a particular radio station, when the radio plays a particular song, etc.

FIG. 3 is a flowchart of an exemplary process 300 that may be implemented by one or more components, such as the processing device 135, of the system 105 shown in FIGS. 1 and 2.

At block 305, the processing device 135 may determine a location of the host vehicle 100. The location of the host vehicle 100 may be determined from, e.g., signals output by the navigation system 125. The location may include a ZIP code, city, county, latitude and longitude coordinates, nearest intersection, or the like.

At block 310, the processing device 135 may query the social network server 110 for social network information. The processing device 135 may, e.g., send the query via the communication interface 130. The social network information may include the name and vehicle location of any one or more users of a social network that have a social network relationship with the driver of the host vehicle 100. The processing device 135 may query the social network server 110 periodically or in response to an occurrence of a predetermined event. Examples of predetermined events may include, e.g., when the host vehicle 100 is stopped in traffic, when the host vehicle 100 is near a particular landmark, when a radio of the host vehicle 100 is tuned to a particular radio station, when the radio plays a particular song, etc.

At block 315, the processing device 135 may receive the social network information. The social network information may be transmitted to the communication interface 130, either in response to the query at block 310 or automatically, from the social network server 110 over the communication network 115. The communication interface 130 may transmit the social network information to the processing device 135.

At block 320, the processing device 135 may determine the location of the other vehicle from the social network information. The location may include a ZIP code, city, county, latitude and longitude coordinates, nearest intersection, or the like.

At block 325, the processing device 135 may determine the proximity of the host vehicle 100 to the other vehicle based on the locations determined at blocks 305 and 320, respectively. The proximity may include a distance or whether both vehicles are in the same ZIP code, city, county, near a particular landmark, etc.

At block 330, the processing device 135 may generate a message that identifies the driver of the host vehicle 100 and the driver of the other vehicle. Moreover, the message may describe a common experience of both drivers. Examples of common experiences may include when two or more drivers are sitting in the same traffic jam, listening to the same radio station or songs, passing a particular landmark at or around the same time, or the like.

At block 335, the processing device 135 may present the message to the driver. The message may be presented via, e.g., the user interface device 120. Presenting the message may include a visual representation of the message that includes text. Alternatively or in addition, the message may be played audibly for the driver of the host vehicle 100. Presenting the message may further include a prompt for the driver to approve the message.

At decision block 340, the processing device 135 may determine whether the driver of the host vehicle 100 has approved the message. If so, the process 300 may continue at block 345. If the message has not been approved, the message may be deleted and the process 300 may return to block 305.

At block 345, the processing device 135 may transmit the message to the social network server 110. For instance, the processing device 135 may command the communication interface 130 to transmit the message to the social network server 110 over, e.g., the communication network 115. The process 300 may return to block 305 after block 345.

FIG. 4 is a flowchart of another example process 400 that may be implemented by one or more components, such as the processing device 135, of the system 105 shown in FIGS. 1 and 2.

At block 405, the processing device 135 may receive a diagnostic code from, e.g., a controller area network (CAN) bus. The diagnostic code may represent a detected vehicle fault.

At block 410, the processing device 135 may generate a message that includes a description of the vehicle fault represented by the diagnostic code received at block 405. The message may be generated to conform to a format associated with a social networking website hosted by, e.g., the social network server 110. The message may further include certain permissions, including privacy permissions. The privacy permissions may indicate who can see the contents of the message. For instance, the privacy permissions may indicate that the content can only be viewed by those with whom the user has a social networking relationship. Alternatively, the privacy permissions may permit others to see the contents of the message. Therefore, the user's "friends" may be permitted to share the message with others, including a mechanic.

At block 415, the processing device 135 may transmit the message generated at block 410 to the social network server 110. The message may be transmitted via, e.g., the communication interface 130 over the communication network 115. Once received at the social network server 110, the message may be posted to the user's "friends" as a status update in accordance with the privacy permissions discussed above. In some instances, the message may be shared with a mechanic based on, e.g., a current zip code of the vehicle 100. The message may be transmitted to the mechanic via the communication interface 130 or the social network server 110. Using the social networking website, the mechanic may provide information to the user about the diagnostic code, an estimate to correct the issue, the amount of time needed to address the issue, etc. The process 400 may end after block 415.

In general, computing systems and/or devices may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a navigation system configured to determine a first vehicle location associated with a first vehicle;
a communication interface configured to receive social network information from a social network server over a communication network, the social network information including a second vehicle location associated with a second vehicle; and
a processing device configured to determine the proximity of the first vehicle location to the second vehicle location from the social network information, determine an identity of an occupant of the second vehicle from the social network information, and generate a message to the social network server based on the proximity of the first vehicle location to the second vehicle location, wherein the message includes the identity of the occupant of the second vehicle and the proximity of the second vehicle to the first vehicle determined in accordance with the social network information;
wherein the communication interface is configured to transmit the message over the communication network to the social network server.

2. The vehicle system of claim 1, wherein the processing device is configured to compare the proximity to a predetermined distance threshold.

3. The vehicle system of claim 2, wherein the processing device is configured to generate the message if the proximity of the first vehicle location to the second vehicle location is below the predetermined distance threshold.

4. The vehicle system of claim 2, wherein the predetermined distance threshold is based at least in part on a ZIP code.

5. The vehicle system of claim 4, wherein the processing device is configured to generate the message if the first vehicle location and the second vehicle location are in the same ZIP code.

6. The vehicle system of claim 1, wherein the message includes at least one of a traffic update and a vehicle status update.

7. The vehicle system of claim 1, wherein the communication interface is configured to pair with a computing device and communicate with the social network server via the computing device.

8. The vehicle system of claim 1, wherein the processing device is configured to query the social network server for the social network information.

9. A vehicle system comprising:
a navigation system configured to determine a first vehicle location associated with a first vehicle;
a communication interface configured to receive social network information from a social network server over a communication network, the social network information including a second vehicle location associated with a second vehicle; and
a processing device configured to query the social network server for the social network information, determine the proximity of the first vehicle location to the second vehicle location from the social network information, determine an identity of an occupant of the second vehicle from the social network information, and generate a message to the social network server based on the proximity of the first vehicle location to the second vehicle location, the message including the identity of the occupant of the second vehicle and the proximity of the second vehicle to the first vehicle determined in accordance with the social network information;
wherein the communication interface is configured to transmit the message over the communication network to the social network server.

10. The vehicle system of claim 9, wherein the processing device is configured to compare the proximity to a predetermined distance threshold.

11. The vehicle system of claim 10, wherein the processing device is configured to generate the message if the proximity of the first vehicle location to the second vehicle location is below the predetermined distance threshold.

12. The vehicle system of claim 10, wherein the predetermined distance threshold is based at least in part on a ZIP code, and wherein the processing device is configured to generate the message if the first vehicle location and the second vehicle location are in the same ZIP code.

13. A method comprising:
determining a location of a first vehicle;
receiving social network information from a social network server;
determining a location of a second vehicle and an identity of an occupant of the second vehicle from the social network information;
determining the proximity of the location of the first vehicle to the location of the second vehicle from the social network information;

generating a message based on the proximity of the first vehicle location to the second vehicle location, the message including the identity of the occupant of the second vehicle and the proximity of the second vehicle to the first vehicle determined in accordance with the social network information; and transmitting the message to a social network server.

14. The method of claim 13, wherein the proximity is determined from at least one of a distance between the first vehicle and the second vehicle relative to a threshold and whether the first vehicle and the second vehicle are located in the same ZIP code.

15. The method of claim 13, further comprising querying the social network server for the social network information.

* * * * *